United States Patent [19]

Dahl

[11] Patent Number: 5,119,582
[45] Date of Patent: Jun. 9, 1992

[54] ARTIFICIAL FISHING LURE

[75] Inventor: Terrance L. Dahl, Madeira, Calif.

[73] Assignee: Alstromeria, Inc., Austin, Tex.

[21] Appl. No.: 662,828

[22] Filed: Mar. 1, 1991

[51] Int. Cl.$^5$ ............................................. A01K 85/00
[52] U.S. Cl. .................................. 43/42.36; 43/42.28
[58] Field of Search ................ 43/42.36, 42.45, 42.28, 43/42.05, 42.08

[56] References Cited

U.S. PATENT DOCUMENTS

| | | | |
|---|---|---|---|
| 2,820,314 | 1/1958 | Scott | 43/42.39 |
| 3,108,390 | 10/1963 | Knight | 43/42.36 |
| 3,877,168 | 4/1975 | Stevens | 43/42.36 |
| 4,163,337 | 8/1979 | Kress | 43/42.36 |
| 4,215,506 | 8/1980 | LeBoeuf | 43/42.36 |
| 4,625,447 | 12/1986 | Buchanan | 43/42.36 |
| 4,672,766 | 6/1987 | Mattison | 43/42.36 |

Primary Examiner—Richard K. Seidel
Assistant Examiner—Chuck Y. Mah
Attorney, Agent, or Firm—Foley & Lardner

[57] ABSTRACT

This invention discloses an artificial fishing lure having a flexible main body with a longitudinal bore. A rigid tube is disposed in the bore to provide stiffness to the main body, and a flexible tube is disposed in the rigid tube so that a fishing line can pass through the flexible tube allowing the fishing lure to be slidable on the fishing line. A second embodiment is also disclosed which has a main body, bore and rigid tube as described above. However, in the second embodiment there is no flexible tube and a fishing line is fixedly connected to a cable which runs through the rigid tube.

19 Claims, 2 Drawing Sheets

ARTIFICIAL FISHING LURE

BACKGROUND OF THE INVENTION

1. Field of the Invention

This invention relates to an artificial fishing lure, and more particularly to an artificial fishing lure which is soft, resilient, lightweight and durable.

2. Brief Description of the Prior Art

It is generally recognized that the use of artificial lures is critical for catching certain types of saltwater and freshwater fish. However, for an artificial lure to be effective its appearance, movement in the water and body composition are all critical features. The general appearance (shape, color) and movement in the water of the lure will initially attract the fish. However, once a fish bites down on a lure, the feel of the lure will generally determine if the fish will strike again. Thus, if the lure body is made of a hard composition, the fish may only strike once. In this situation, if the fish is not hooked during the first strike, the opportunity of catching it may be lost.

As previously stated, the movement of lures in the water is also a very important feature particularly while trolling for fish. It is very desirable to have a lure that is lightweight and buoyant so that it rides the surface of the water thereby attracting fish.

Additional features known in the art which are used to attract fish include artificial lures having skirts attached to the lure body which simulate the motion of fish in the water, and reflecting eyes mounted to the lure body. The skirts also provide an additional advantage in that the hook can be hidden behind the skirt.

Finally, since it is desirable to reuse the artificial lures for economic reasons, fishing lures which are slidably mounted on fishing lines are known. These lures allow one to recover the lure after the fish is hooked by simply sliding the lure away from the hook.

As a result of the aforementioned desired features, numerous fishing lures have been designed over the years. Many of these lures, such as the one disclosed in U.S. Pat. No. 4,625,447 have lightweight plastic bodies. However, these bodies have hard surfaces. In U.S. Pat. 2,820,314, a sponge rubber body is disclosed. This body does provide a softer feel to the fish, but it cannot withstand the abuse that a fishing lure takes by repeatedly being struck by fish. Particularly in deep sea fishing scenarios where large fish such as marlin and tuna are being fished for, the soft sponge rubber body would be destroyed very easily.

In U.S. Pat. No. 3,877,168 a molded cellular polystyrene body is used in a fishing lure. While this construction provides a lightweight lure, it is highly susceptible to damage from fish bites. Accordingly, in this patent, the body is coated with a epoxy plastic resin which produces a hard outer surface.

Thus, in the current art of artificial fishing lures, the fishing lure body is made of either a hard material which tends to repel fish after a first bite or is made of a softer material which is not very resilient and which is easily damaged or destroyed when struck by a fish. What the current art of artificial fishing lures is lacking is an artificial lure which is buoyant, lightweight and soft, and which is resilient enough to withstand the abuse of repeated fish attacks thereby allowing it to be reused.

SUMMARY OF THE INVENTION

It is an object of the invention to provide an artificial lure which is soft so that it feels natural to a fish when the fish bites down.

Another object of the invention is to provide a lightweight artificial lure that will ride on the surface of the water.

Another object of the invention is to provide an artificial lure that is very resilient and durable and which is capable of withstanding fish bites without being destroyed.

It is yet another object of the invention to provide an artificial lure which is lightweight such that the weight of the lure will not cause the fish hook to become disengaged from the fish as the fish shakes its head to and fro.

In accordance with one aspect of the invention, the above objectives are met by an artificial fishing lure which has a flexible main body having a longitudinal bore and a rigid tube disposed in the bore which provides stiffness to the main body. In addition, a flexible tube is disposed in the rigid tube for slidably engaging a fishing line.

It is a further objective of the invention to provide an artificial lure which absorbs smells, such as tuna blood, to increase the attraction of fish to the lure.

In accordance with another aspect of the invention the above objective is met by providing a fishing lure whose main body is made from a high density closed cell foam polymer tubing.

It is still another objective to provide an artificial lure which is slidable on a fishing line so that the lure can be retrieved after the fish is hooked.

It is still another object of the invention to provide an artificial lure that will act like an injured (gill-shot) fish which paddles around in circles halfway in and halfway out of the water.

In accordance with another aspect of the invention, the above objective is met by providing a fishing lure as described above but further including a main body with first and second adjacent cylindrical portions where the outside diameter of the first portion is greater than the outside diameter of the second portion and a vinyl skirt is wrapped around the second portion.

Yet another object of the invention is to provide a freshwater version of an artificial lure which has hooks exposed and is not slidable on a line.

In yet another aspect of the invention, the above objective is met by an artificial fishing lure having a flexible main body with a longitudinal bore and a rigid tube disposed in the bore. In addition, a flexible tube is disposed in the rigid tube which is adapted to receive means for connecting a fishing line at one end of the main body and to receive means for connecting a fishing hook at an opposite end of the main body.

BRIEF DESCRIPTION OF THE DRAWINGS

Other objects, features and advantages of the present invention will become apparent from the following detailed description and accompanying drawings wherein.

DETAILED DESCRIPTION OF THE PREFERRED EMBODIMENTS

Figure 1:
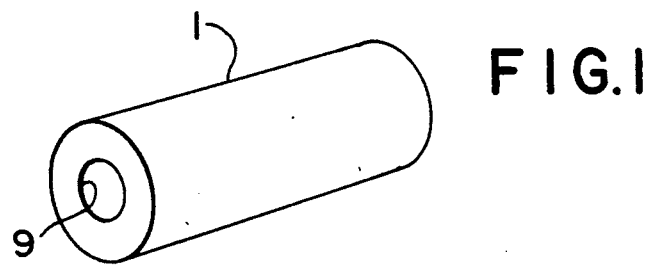
FIG. 1 is a perspective view of a high density closed cell foam polymer tubing.

FIG. 1 shows a section of a high density closed cell foam polymer tubing 1 made from any type of foam polymer having the desired characteristics, with tubing sold under the brand name Hypalon being very satisfactory and preferred. Hypalon tubing is not water absorbent, does not fade or deteriorate in the sun, and comes in a variety of density grades (A-D) to permit lure design to be adapted to particular fish. The density of the lure body should be such that when striking the lure the fish encounters a natural density similar to the density of the fish on which it normally feeds.

Figure 2:
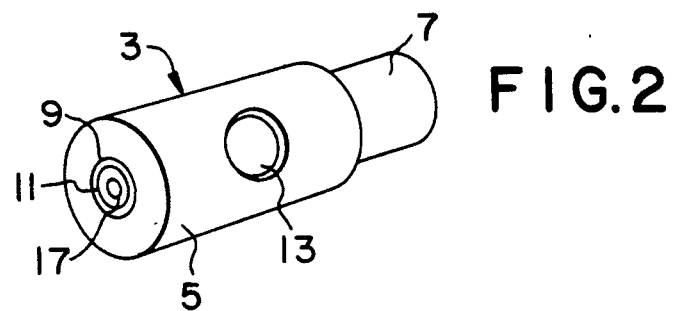
FIG. 2 is a perspective view of the main body of an artificial lure.

Referring to FIG. 2, the main body 3 of the lure formed from the tubing 1 consists of first and second adjacent cylindrical portions 5, 7, with the outer diameter of portion 5 being greater than the outer diameter of portion 7. The portion 7 can be reduced by sanding, routing, by using a lathe, or by any suitable and known means forming no part of the present invention.

Main body 3 has a central bore 9 extending completely through portions 5, 7 along a longitudinal axis. A rigid plastic tube is coaxially disposed in central bore 9 and acts as a stiffener for main body 3. It is this combination of a soft main body 3 and rigid plastic tube 11 which provides for a soft and yet resilient and durable artificial lure. Fish like the feel of the lure and can continue to bite at it without causing damage to the lure. Additionally, the high density closed cell tubing 1 absorbs smells such as tuna blood which further enhances the attraction of fish to the artificial lure.

Figure 4:
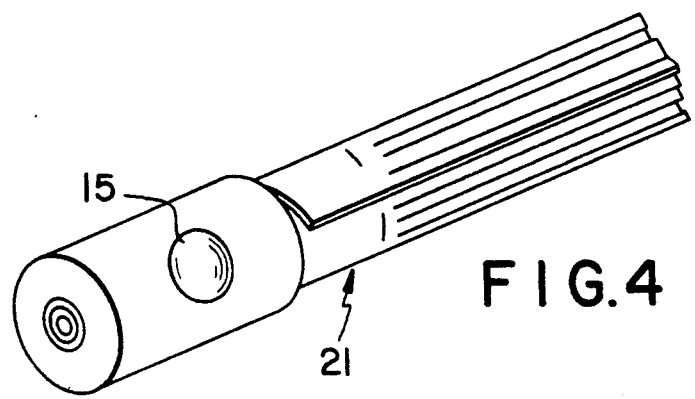
FIG. 4 is a perspective view similar to FIG. 2 but showing a reflector and a skirt attached to the main body.
Figure 5:
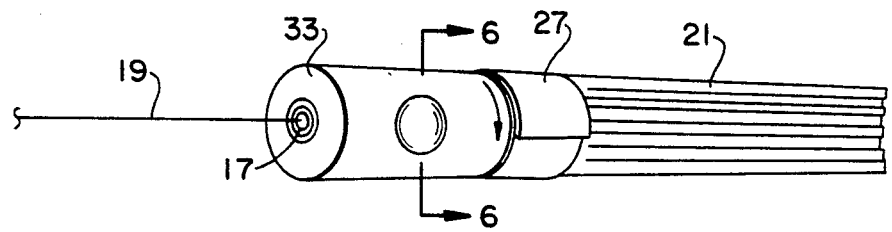
FIG. 5 is a perspective view similar to FIG. 4 but showing a reflecting wrap around the attached end of the skirt.
Figure 6:
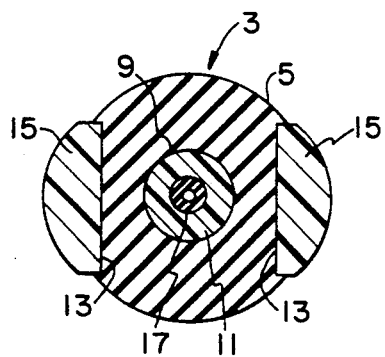
FIG. 6 is a cross-sectional view taken through section A—A of FIG. 5.

As shown in FIG. 2, a cut-out or depression 13 is formed in the enlarged cylindrical portion 5 of the body, with the depression being adapted to receive a mirrored reflector 15, shown in FIGS. 4–6. Reflector 15 can be bonded in the depression 13 or attached by other suitable means. Referring to FIG. 6, a similar reflector 15 is situated in a second cut-out or depression directly opposite to the reflector 15 shown in FIG. 5. Reflectors 15 are very effective in attracting fish to the artificial lure.

Referring to FIGS. 2, 5 and 6, a hollow flexible tube 17 which can be made of soft rubber or a similar soft flexible material such as plastic is coaxially disposed in the rigid tube 11. The flexible tube 17 has an interior diameter sufficiently large to loosely receive fishing line 19, shown in FIGS. 5, 7 and 8, which allows the artificial lure to be slidable along fishing line 19. Flexible tube 17 provides a soft surface against which fishing line 19 can rub without causing damage to or cutting the line.

Figure 3:
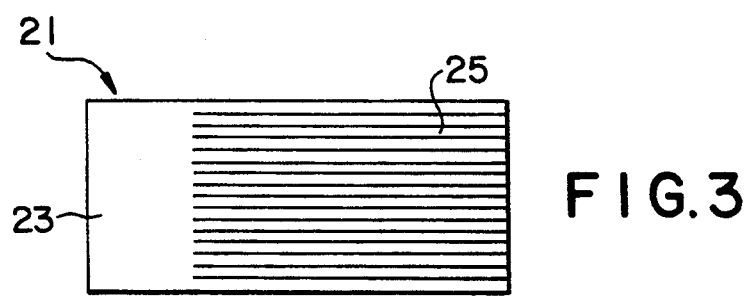
FIG. 3 is a top view of a skirt for the lure.

FIG. 3 shows a skirt 21 which can be made of vinyl or other flexible materials. Skirt 21 has a solid top portion 23 which connects individual strands 25. Skirt 21 can be made in many different colors and preferably is made of a reflecting vinyl. Two common vinyl skirts which can be used are well known and commonly referred to in the art as "Newell" skirting and "Tralright" skirting.

As shown in FIG. 4, skirt 21 is wrapped around the reduced diameter cylindrical portion 7 of the body, and the skirt can be attached thereto by bonding or the like. Additionally, a second skirt (not shown) can be wrapped around and attached to skirt 21. When a two skirt configuration is used, it is preferable to have the outer skirt made of a reflective vinyl. It is important to note that skirt 21 provides two functions. First, it helps attract the fish due to its reflective nature and second, when main body 3 is bobbing up and down in the water and strands 25 are opening and closing, the artificial lure simulates an injured fish (gill-shot) paddling around in circles halfway in and halfway out of the water.

In FIG. 5, a reflecting tape is wrapped around solid top portion 23 of skirt 21 providing an additional item to which fish are attracted. Reflecting tape 27 can be an adhesive Mylar ® tape or a similar material.

Figure 7:
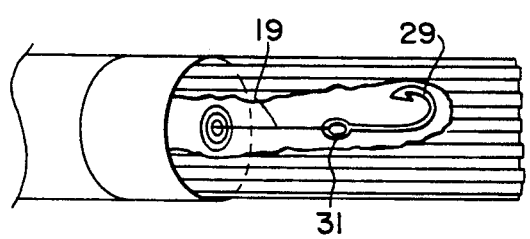
FIG. 7 shows a perspective view of the skirt and the artificial lure, with a portion of the skirt cut away revealing the fishing hook.

In FIG. 7, there is shown a cutaway view of a portion of skirt 21 exposing a conventional fishing hook 29 which is normally hidden behind or within strands 25. Fishing hook 29 is connected to fishing line 19 at loop 31. The diameter of the loop 31 of fishing hook 29 is greater than the inner diameter of flexible tube 17 thereby preventing the hook from being pulled through the flexible tubing 17. Although the loop is shown spaced from the end of the body in FIG. 7, it will be understood that when the line is pulled, the loop 31 will engage the end of the body since the body is slidable on the line. The hook is thus well covered and protected within the strands 25 to which the fish are attracted.

While FIG. 5 represents one embodiment of the artificial lure, several design changes can be made to main body 3 to cause the artificial lure to behave differently while being pulled through the water. For example, the flat face 33, shown in FIG. 5, could be deeply scooped, a design which is particularly useful for slow-trolling at live-bait speed. In yet another version of the artificial lure, flat face 33 can be modified to have a very gentle scoop and main body 3 can be slightly tapered. In this embodiment, the lure runs underwater for about 30 feet and then pops up and runs on top of the water for another 30 feet. Finally, in still another embodiment, main body 3 can have a reverse taper extending from flat face 33 and along a portion of the sides of main body 3 allowing the lure to swerve back and forth on the face of the wave leaving a bubble trail that wiggles from side to side.

Figure 8:
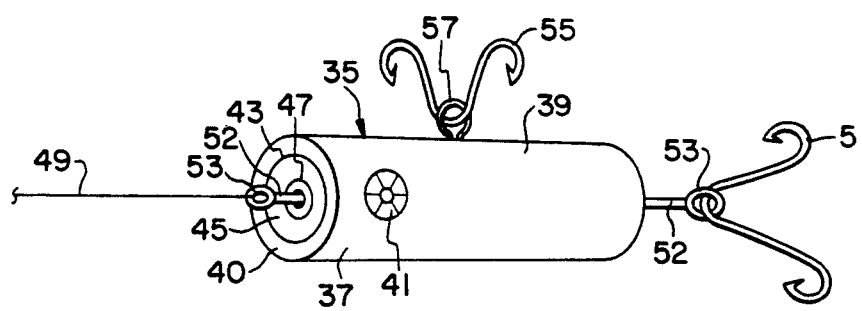
FIG. 8 shows a freshwater version of the artificial fishing lure.

In FIG. 8, a freshwater embodiment of an artificial lure is shown. In this embodiment, main body 35 is constructed identically to main body 3, as discussed above, except that main body 35 has a cylindrical first portion 37 and a substantially cylindrical but slightly tapered second portion 39. In addition, face 40 is scooped.

While the freshwater lure does not have a skirt attached to it, mirrored reflectors 41 are mounted in cutouts or depressions formed in opposite sides of the cylindrical first portion 37, similar to depression 13 and reflector 15 as described above. Central bore 43, and rigid tube 45 are both arranged as discussed in the first embodiment.

One difference between the FIG. 8 embodiment and the embodiment described above concerns the attachment of the fishing line 49 and fishing hook 51. In this embodiment, fishing line 49 is not slidably mounted. Instead, a small cable 52 with a loop 53 at both ends is disposed in rigid tube 45. Fishing line 49 is attached to loop 53 at one end while fish hook 51 is connected to loop 53 at the opposite end of cable 52. Additionally, tubular rubber inserts 47 are disposed in each end of rigid tube 45 to secure cable 52 in place. However, in smaller versions of the fresh water lure, the rubber insert 47 may not be required since cable 52 will fit tightly into rigid tube 45. In the form shown, a second fish hook 55 is connected to an eye hook 57 which is mounted to main body 35.

While several embodiments of the invention have been described, it will be understood that further modifications are still capable, and this application is intended to cover any variations, use or adaptation of the invention and including such departures from the present disclosure as to come within the knowledge of customary practice in the art to which the invention pertains, and as may be applied to the essential features hereinbefore set forth and following within the scope of the invention and the limits of the appended claims.

What is claimed is:

1. An artificial fishing lure, comprising:
   (A) a flexible main body having a longitudinal bore,
   (B) a rigid tube disposed in said bore for stiffening said main body, and
   (C) a flexible tube disposed in said rigid tube and through which a fishing line can pass, the flexible tube being slidably mounted on said fishing line.

2. An artificial fishing lure as claimed in claim 1, wherein said main body is made from a high density closed cell foam polymer tubing.

3. An artificial fishing lure as claimed in claim 2, wherein said main body has longitudinally spaced first and second cylindrical portions, said first portion having an outside diameter greater than an outside diameter of said second portion.

4. An artificial fishing lure as claimed in claim 3, further comprising a first skirt which is wrapped around said second portion.

5. An artificial fishing lure as claimed in claim 4, further comprising a second skirt which is wrapped around said first skirt.

6. An artificial fishing lure as claimed in claim 5, wherein said first skirt is made of vinyl and said second skirt is made of a reflecting vinyl.

7. An artificial fishing lure as claimed in claim 5, further comprising a reflecting wrap which is wrapped around said second skirt.

8. An artificial fishing lure as claimed in claim 3, further comprising at least one cut-out formed in the surface of said first portion, and a reflector mounted in said cut-out.

9. An artificial fishing lure as claimed in claim 1, wherein said rigid tube is made of plastic.

10. An artificial fishing lure as claimed in claim 1, wherein said flexible tube is made of rubber.

11. An artificial fishing lure as claimed in claim 1, wherein said main body has first and second ends, said first end having a flat face.

12. An artificial fishing lure as claimed in claim 1, wherein said main body has first and second ends, said first end having a scooped face.

13. An artificial fishing lure as claimed in claim 1, wherein said main body is made from a high density closed cell foam polymer tubing and has longitudinally spaced first and second cylindrical portions, said first portion having an outside diameter greater than an outside diameter of said second portion, and further comprising a first skirt which is wrapped around said second portion, and at least one cut-out formed in the surface of said first portion, and a reflector mounted in said cut-out.

14. An artificial fishing lure comprising:
   (A) a flexible main body having a longitudinal bore, said main body being made of a high density closed cell foam polymer tubing and having longitudinally spaced first and second portions, said first portion being cylindrical and said second portion being substantially cylindrical, at least one cut-out formed in the surface of said first portion, and a reflector mounted in said cut-out;
   (B) a rigid tube disposed in said bore for stiffening said main body, and
   (C) a cable having first and second loops at opposite ends, said cable disposed in said rigid tube.

15. An artificial fishing lure as claimed in claim 14, wherein said main body has a first end having a scopped face.

16. An artificial fishing lure as claimed in claim 15, further comprising means for connecting a first fish hook to the surface of said main body, and wherein said first loop is connected to a fishing line and said second loop is connected to a second fish hook.

17. An artificial fishing lure comprising:
   (A) a flexible main body having a longitudinal bore,
   (B) a rigid tube disposed in said bore for stiffening said main body, said rigid tube being made of plastic, and wherein said main body is made of a high density closed cell foam polymer tubing and has longitudinally spaced first and second portions, said first portion being cylindrical and said second portion being substantially cylindrical, at least one cut-out formed in the surface of said first portion, and a reflector mounted in said cut-out; and
   (C) a cable having first and second loops at opposite ends, said cable disposed in said rigid tube.

18. An artificial fishing lure as claimed in claim 17, wherein said main body has a first end having a scopped face.

19. An artificial fishing lure as claimed in claim 18, further comprising means for connecting a first fish hook to the surface of said main body, and wherein said first loop is connected to a fishing line and said second loop is connected to a second fish hook.

* * * * *